(12) United States Patent
Godard

(10) Patent No.: US 11,654,801 B2
(45) Date of Patent: May 23, 2023

(54) ELECTRIC LATCH OF A MOTOR VEHICLE BACKREST

(71) Applicant: U-SHIN FRANCE, Creteil (FR)

(72) Inventor: Jerry Godard, Abbeville (FR)

(73) Assignee: U-SHIN FRANCE, Creteil (FR)

( * ) Notice: Subject to any disclaimer, the term of this patent is extended or adjusted under 35 U.S.C. 154(b) by 386 days.

(21) Appl. No.: 17/097,539

(22) Filed: Nov. 13, 2020

(65) Prior Publication Data

US 2021/0061145 A1 Mar. 4, 2021

Related U.S. Application Data

(63) Continuation of application No. PCT/FR2019/051095, filed on May 14, 2019.

(30) Foreign Application Priority Data

May 16, 2018 (FR) ..................................... 18/70569

(51) Int. Cl.
| | |
|---|---|
| *B60N 2/36* | (2006.01) |
| *B60N 2/22* | (2006.01) |
| *E05B 81/06* | (2014.01) |
| *E05B 81/14* | (2014.01) |
| *E05B 81/16* | (2014.01) |
| *B60N 2/90* | (2018.01) |
| *B60N 2/30* | (2006.01) |

(52) U.S. Cl.
CPC ............... *B60N 2/366* (2013.01); *B60N 2/22* (2013.01); *B60N 2/2209* (2013.01); *E05B 81/06* (2013.01); *E05B 81/14* (2013.01); *E05B 81/16* (2013.01); *B60N 2/3002* (2013.01); *B60N 2002/924* (2018.02)

(58) Field of Classification Search
CPC .............................. B60N 2/366; B60N 2/2209
See application file for complete search history.

(56) References Cited

U.S. PATENT DOCUMENTS 7,226,129 B2 * 6/2007 Brandes ................. B60N 2/366
296/68.1
7,635,166 B2 12/2009 Ishikawa

FOREIGN PATENT DOCUMENTS

DE 102010045207 12/2011
DE 202020100306 U1 * 3/2020 ........... B60N 2/0232
(Continued)

OTHER PUBLICATIONS

International Search Report for International Application PCT/FR2019/051095, dated Sep. 26, 2019.

*Primary Examiner* — Timothy J Brindley
(74) *Attorney, Agent, or Firm* — Burris Law, PLLC

(57) ABSTRACT

An electric lock for a fold-down seat of a motor vehicle is situated inside a housing. The lock includes a locking means, a blocking element, a transmission lever attached to the blocking element so as to move it between a position of blocking the locking means in the catch retention position and a position in which it is effaced with respect to the movement of the locking means. The lock includes an actuator comprising an electric motor, the actuator being able to move the transmission lever. The transmission lever of the lock is able to move about an axis of rotation and has two arms extending radially from the axis, the first arm at its end having a handle and the second arm at its end having a means of attachment to the blocking element.

14 Claims, 3 Drawing Sheets

(56) References Cited

FOREIGN PATENT DOCUMENTS

| | | | |
|---|---|---|---|
| DE | 102019131351 A1 * | 5/2021 | |
| EP | 1410945 | 4/2004 | |
| WO | 2008145668 | 12/2008 | |
| WO | WO-2010115626 A1 * | 10/2010 | ........... B60N 2/0232 |

* cited by examiner

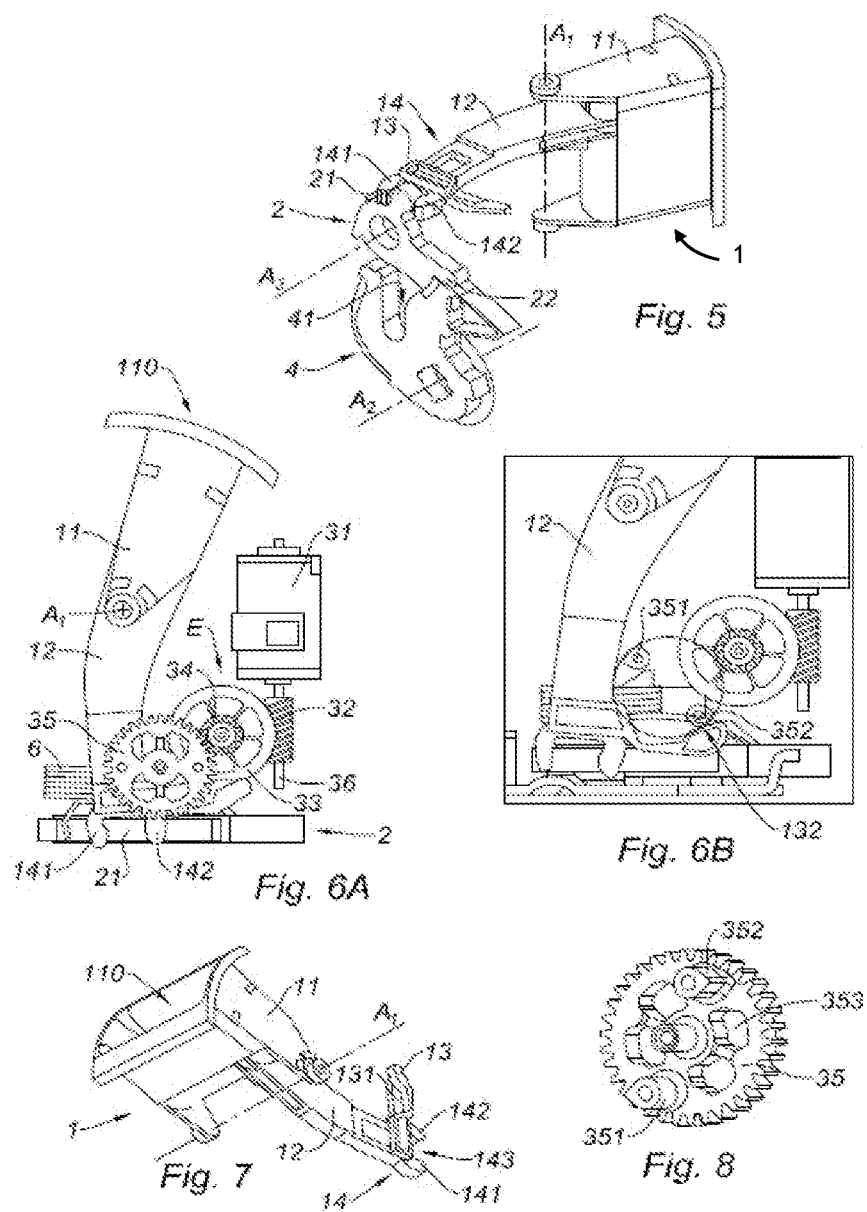

ELECTRIC LATCH OF A MOTOR VEHICLE BACKREST

CROSS-REFERENCE TO RELATED APPLICATIONS

This application is a continuation of International Application No. PCT/FR2019/051095, filed on May 14, 2019, which claims priority to and the benefit of FR 18/70569, filed on May 16, 2018. The disclosures of the above applications are incorporated herein by reference.

FIELD

The present disclosure relates to an electric latch for the locking and the unlocking of a motor vehicle seat or backrest and, specifically, for rear bench seats of the motor vehicle.

BACKGROUND

The statements in this section merely provide background information related to the present disclosure and may not constitute prior art.

A latch of a motor vehicle backrest typically includes a bolt that, when closed, is configured to pivot in a direction around a striker fastened on a structure in order to ensure closure and holding of the backrest or seat of the vehicle.

Folding of the backrest or the bench seat, to increase the volume of the trunk for example, is typically enabled by a release of the backrest held by the latch following a rotation of the bolt in the reverse direction. This rotation in the reverse direction to fold down the backrest is generally done using a handle located on the vehicle seat and connected to the latch by a control means such as a cable or a rod which acts mainly on an opening lever in order to make the pawl pivot, which in turn releases the bolt via a hooking device in the desired direction.

In some applications, a handle at the level of the articulations of the seat can control locking/unlocking and a pull tab in the trunk can act manually on the pawl and release the bolt. This can avoid having to go back into the passenger compartment to unlock the latch and be able to fold down the backrest or the bench seat.

The use of electrical systems to control movable elements inside the passenger compartment is a phenomenon that is increasingly widespread, which corresponds to comfort requirements that are increasingly strong.

Thus, for vehicle seats with an electric unlocking, the typical solution also consists in having a remote motor-driven actuator because of the volume required for the latter. The motor may thus be arranged in the seat or on the low side of the bench seat for example.

In an example of this approach, the U.S. Pat. No. 7,635,166 concerns a control device such as a handle for a locking device of the latch type which locks a backrest, provided with: a support having an opening at an upper end thereof; an actuating button which is provided in the opening of the support, and which transmits the movement to the latch of the seat during a human action on the handle.

This type of device has the drawback of being both bulky because it consists of two distinct portions, namely the handle on the one hand and the latch on the other hand, and uncomfortable because it systematically requires activating the unlocking of the seat by oneself. Comfort can be even more reduced as the handle is in an impractical place in terms of access.

In order to address this need for human action, there is also known the patent application EP1410945 which concerns a rear seat lock, configured in particular for motor vehicles, which has an electric control device based on a motor and activated remotely. This lock is concealed by adequate covers so that no control device is visible.

This device requires a means such as a cable or a rod to unlock the latch, adding complexity. Furthermore, the motor of this latch requires the presence of switches to obtain information about the position of the wheel of the actuator in order to determine when to operate, for example, in reverse drive or reset the actuator. This adds complexity and electrical elements prone to failure.

These issues with electric seat latches, among others, are addressed by the teachings of the present disclosure.

SUMMARY

This section provides a general summary of the disclosure and is not a comprehensive disclosure of its full scope or all of its features.

In order to overcome the drawbacks of typical electric seat latches, the present disclosure provides a solution which allows having an autonomous and compact backrest latch in the form of an integrated module.

For this purpose, the teachings of the present disclosure provide an electric latch for a folding seat of a motor vehicle, located inside a case. In one form, the latch includes:
- a locking means adapted to be displaced between a position in which a striker is retained and a position in which the striker is released,
- a blocking element adapted to be displaced between a position for blocking the locking means in the striker retention position and a position for clearing the way with respect to the displacement of the locking means,
- a transmission lever secured to the blocking element so as to displace it between the positions for blocking the locking means in the striker retention position and the position for clearing the way with respect to the displacement movement of the locking means,
- an actuator including an electric motor, the actuator being adapted to displace the transmission lever, wherein the transmission lever moves about an axis of rotation A1 and has two arms extending radially from the axis, the first arm having at its end a handle for manually displacing the transmission lever and the second arm having at its end means for securing to the blocking element.

In one form, the locking means is a bolt rotatable about its axis A2 including a depression adapted to receive a striker and the blocking element is a pawl rotatable about its axis A3, the pawl including two radial excrescences, the first one is adapted to abut against the bolt to hold it in the striker retention position and the second one is a ball joint adapted to be displaced by the transmission lever.

In an alternative form, the securing means is shaped like a fork with two teeth, where the space between the two teeth is adapted to grasp the blocking element so as to be able to displace it between the blocking and clearing positions. In one form, the securing means is an element belonging to the transmission lever and that this element is distinct from the blocking element. Nevertheless, securing by the fork allows avoiding the presence of any clearance that could generate unpleasant noises while permitting driving in both directions as a result of the two teeth.

In yet another form, the securing means includes a third arm extending transversely with respect to the transmission lever and including a recess adapted to receive an element for driving the actuator. This has the advantage of permitting the securing means—and therefore the transmission lever—to be able to be driven in rotation by the actuator through the recess. The same transmission lever which acts on the blocking element may thus be moved both by the handle and by the actuator through the securing means.

In one form, the actuator includes a worm screw driven in rotation by the motor, the screw driving in rotation a driving toothed wheel in turn adapted to drive in rotation a driven toothed wheel, the driven toothed wheel having at least one radially eccentric drive element projecting axially with respect to its axis of rotation A4. This compact gear allows optimizing the dimensioning of the motor so as to displace the transmission lever with the minimum volume. It is thus possible to have the entire electric latch in a case that is compact and easy to fasten on a vehicle backrest.

In one form, the driven toothed wheel has two drive elements diametrically opposite to one another and disposed on the same face of the driven toothed wheel (35). The distance to be covered to be able to unlock the latch is thus reduced by half, thereby improving the service life of the actuator and therefore the latch. Furthermore, this permits a rotation by 180° so as to be able to displace the transmission lever 1 each time by bearing on the coplanar walls of the recess 131. The second stud abuts to stop the displacement of the arm 13.

In order to be able to change planes in the actuator and use all available space, the driving toothed wheel drives in rotation the driven toothed wheel via a pinion.

To optimize the contact between the recess and the drive element, the latter can be a stud shaped like a water drop projecting axially from the driven toothed wheel so as to displace the transmission lever by abutment—of the drive element—on the contact surfaces of the recess.

In one form, in order to further improve the compactness, the axes A1 and A4 are parallel, the axes A2 and A3 are parallel, the axes A2 and A3 being perpendicular to the axes A1 and A4.

In one form, the blocking element is connected to an elastic means adapted to bias it towards the position for blocking the locking means in the striker retention position; this permits the blocking element to block the locking means as soon as the striker is engaged with the latter. Furthermore, the locking means is connected to an elastic means adapted to bias it towards the striker release position; this permits the locking means to accompany the unlocking of the backrest during opening, this movement being rather due to a displacement of the motor-driven backrest or by the effect of a spring-type elastic means.

In one form, the latch is secured to a support adapted to be secured to a seat frame and does not include any cable or rod to displace the locking means in a position in which the striker is released.

Furthermore, in one form, the latch does not include any switch to output a stop instruction to the motor or even reverse the direction of rotation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a perspective view of the latch of FIG. 1, illustrating the latch with a motorized actuator hidden from view;

FIG. 6A is a front view of the latch of FIG. 1;

FIG. 6B is a front view similar to FIG. 6A, illustrating the latch with a driven toothed wheel hidden from view;

FIG. 7 is perspective view of a transmission lever of the latch of FIG. 1; and

FIG. 8 is a perspective view of a driven toothed wheel of an actuator of the latch of FIG. 1.

Figure 1:
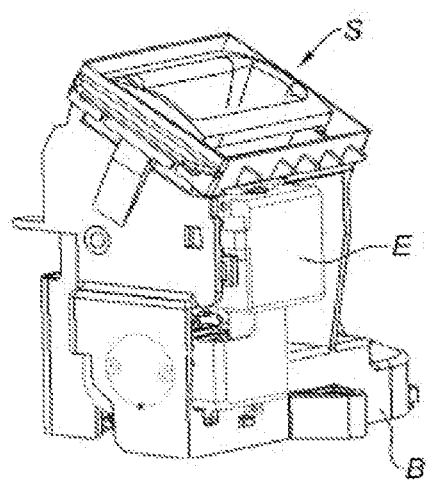
FIG. 1 is a perspective view of a latch according to the teachings of the present disclosure, illustrating the latch in a case.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
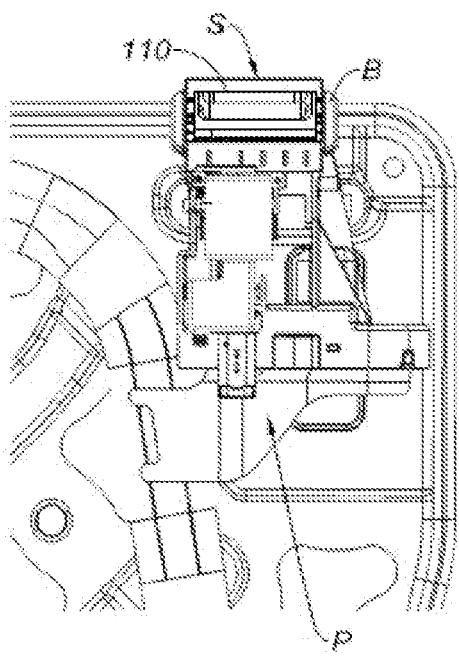
FIG. 2 is a plan view of the latch of FIG. 1, illustrating the latch fastened to a support associated with a seat frame.

Referring to FIGS. 1 and 2, an electric latch S may be disposed within a plastic case B in order to reduce the weight and cost thereof. The actuator of the latch may also be located inside an envelope E to insulate it and protect it (see FIG. 1).

The envelope E may also be made of plastic or of a metallic material such as Zamak (Zn alloy). The handle 110 is accessible to any user of the handle to manually displace the transmission lever 1 (labeled in FIG. 3).

Referring to FIG. 2, a support P provides a fixed bearing of the latch, which is fastened using two screws which pass through the bolt by the axis A2 (shown in FIG. 4) and the pawl by the axis 3. The latch S is fastened on the support P using two screws. The case B is secured to the retention by a plate equipped with hooks C (see FIG. 3).

Figure 3:
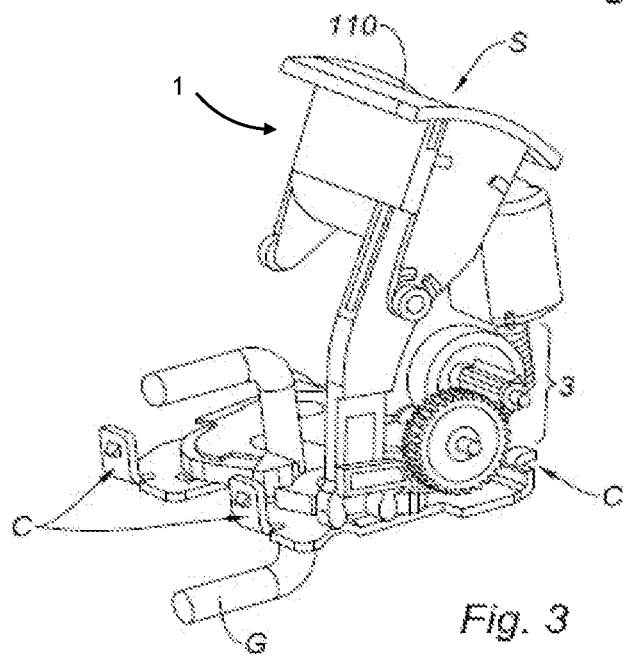
FIG. 3 is a perspective view of the latch of FIG. 1, illustrating the latch without the case and in a closed position where the latch traps a striker in accordance with the teachings of the present disclosure.

Referring to FIG. 3, a striker G is engaged with the latch S so that when the striker G is fastened on a fixed element of the vehicle and the latch S is located on the backrest of the folding seat, the backrest is held by the striker G. By unlocking the latch S, by acting on the handle 110 or remotely in an electrically-powered way, the seat becomes foldable folded down if pushed by a spring-type mechanism.

Figure 4A:
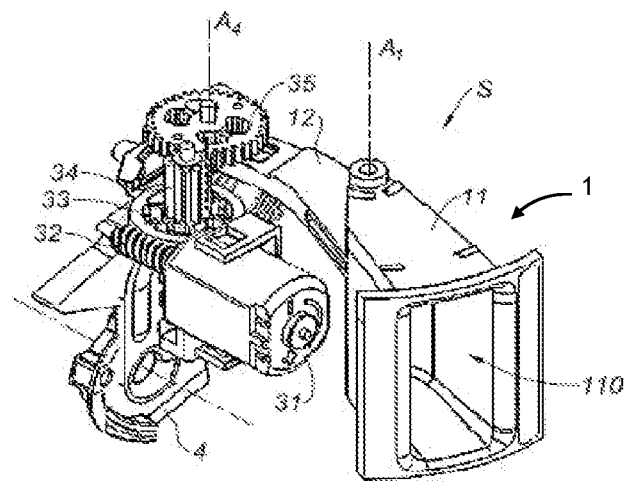
FIGS. 4A and 4B are perspective views of the latch of FIG. 1 according to two different perspectives.
Figure 4B:
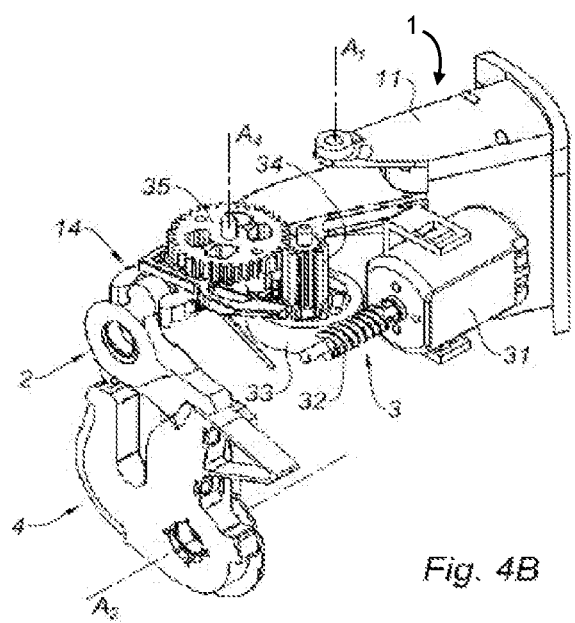

Referring to FIGS. 4A and 4B, the latch S is illustrated according to two different perspectives. In FIG. 4A, there are distinguished the transmission lever 1 which is adapted to be displaced about an axis of rotation A1 and which has two arms 11 and 12 which extend radially from the axis A1 and in two opposite directions in this case so as to lengthen the reach of the transmission lever 1.

The first arm 11 has at its end distal from the pawl 2 (see FIG. 4B) a handle 110 to manually displace the transmission lever 1, and the second arm 12 has at its end proximal to the pawl 2 a means 14 for securing to the pawl 2. The securing means 14 is a fork with two teeth engaging with the pawl 2.

The transmission lever 1 is connected to the pawl 2 and allows making it pivot between a position for blocking the bolt 4 in a striker G retention position (see FIG. 3) and a position for clearing the way with respect to the displacement movement of the bolt 4. Referring to FIG. 4B, the bolt 4 is adapted to rotate about an axis A2 that may be perpendicular to the axis A1 of rotation of the transmission lever 1.

This allows saving space for the latch S. In this FIG. 4B, the pawl 2 retains the bolt 4 which traps a striker (not represented in FIG. 4B). Indeed, the pawl 2 retains the bolt 4 in a known manner against a rotation in the counterclockwise direction with reference to FIG. 4B. This counterclockwise direction rotation corresponds to that of folding of the motor vehicle seat.

FIGS. 4A and 4B also illustrate an actuator 3 configured to move the pawl 2 in a motor-driven way to make it pivot between a position for blocking the bolt 4 in a striker G retention position (see FIG. 3) and a position for clearing the way with respect to the displacement movement of the bolt 4.

The actuator includes a motor assembly 31 and a worm screw 32 on the axis 36 (FIG. 6A) of the motor, a toothed wheel 33 (teeth not represented in FIGS. 4A and 4B), the toothed wheel 33 having in its axis of rotation a pinion 34 transmitting its rotation to another driven toothed wheel 35 rotating about an axis A4. This actuator 3 acts on the pawl 2 through the transmission lever 1 to which it is directly connected.

Referring to FIG. 5, some of the elements of the latch S that permit the displacement of the pawl in a manual way i.e., in a non motor-driven way, are illustrated. In FIG. 5, the actuator 3 has not been illustrated to facilitate understanding.

The axis of rotation A3 of the pawl is parallel to that A2 of the bolt. The rotary bolt 4, including a depression 41 adapted to receive a striker G, is illustrated in FIG. 3. Furthermore, the rotary pawl 2 includes two radial excrescences 21 and 22 the first excrescence 22 is adapted to abut against the bolt 4 to hold it in the striker G retention position and the second excrescence 21 is a ball joint adapted to be displaced by the transmission lever 1.

While described and illustrated in the example spacal arrangement, other spatial arrangements are possible while preserving the function of the pawl 2 and that of the bolt 4. The end of the first radial excrescence 22 rests on a complementary stop surface of the bolt 4 to prevent it from rotating in the counterclockwise direction with reference to FIG. 5.

The ball joint 21 of the pawl 2 is clamped by the two teeth 141 and 142 of the fork 14 of the end 12 of the transmission lever 1.

In this FIG. 5, at the end 12 proximal to the pawl 2 belonging to the transmission lever 1, a third arm 13 is distinguished, extending transversely from the arm 12 and including a recess 131 adapted to receive a drive element of the actuator 3.

FIG. 7 illustrates this third arm 13 as well as the recess 131 according to another perspective. A lateral surface of the recess located on the plane, in which the rotation of the transmission lever 1 is performed, may serve as a guide for the rotation.

Driving of the transmission lever 1 is performed thanks to the driven toothed wheel 35 illustrated in details in FIG. 8. In this figure, it is shown that this driven wheel 35, rotating by the motor 31 through a gear E, has drive elements 351 and 352 projecting axially with respect to the axis of rotation A4 of the driven wheel 35. These drive elements may consist of studs shaped like a water drop.

The two studs 351 and 352 are diametrically opposite to one another, enabling a 180° rotation so as to be able to displace the transmission lever 1 each time by bearing on the coplanar walls of the recess 131. The second stud abuts so as to stop the displacement of the arm 13.

In one form, in order to improve compactness, the axes A1 and A4 are parallel, the axes A2 and A3 are parallel, and that these axes A2 and A3 are perpendicular to the axes A1 and A4.

Furthermore, the pawl 2 can be a central portion of the latch S. The latter can be essentially moved by the actuator 3. Access through the trunk to the latch S of the backrest being impractical, an electric control may be disposed in a location easily accessible to unlock the latch S and make the seat foldable without having to go back into the passenger compartment in the rear seats to manually fold down the seat(s).

The pawl 2 may be displaced according to two directions: in a direction towards a position for clearing the way with respect to the displacement of the bolt 4 and in the other direction towards a position for blocking the rotation of the bolt 4. Referring to FIG. 4B, clearance can be done in a counterclockwise rotation when blocking is done in a clockwise rotation.

The displacement towards a position for clearing the way with respect to the displacement of the bolt 4 may be performed manually by acting directly on the handle 110 or in a motor-driven way, and therefore remotely controlled, through the motor-driven actuator 3. In both cases, the displacement is a rotation about the axis A1 of the transmission lever 1.

After clearing the rotational pathway of the bolt 4 to release a striker, the return of the pawl 2 may be done using a spring-type elastic means 6 adapted to bias it towards the position for blocking the bolt 4 in the striker G retention position.

The bolt 4 is also associated to an elastic means adapted to bias it to the striker G release position. The return of the bolt 4 towards its striker retention position is caused by the striker G (see FIG. 3) when the backrest is returned towards the unfolded position.

The entry of the striker G into the bolt depression 41 (see FIG. 5) creates a clockwise rotation with reference to FIG. 5 bringing the bolt 4 back into the retention position and the biasing spring 6 of pawl 2 will drive a clockwise rotation of pawl 2 towards the anti-counterclockwise rotation blocking position of the bolt 4.

The motor-driven displacement of the transmission lever 1 towards the position for clearing the way with respect to the displacement of the bolt 4 will now be explained with reference to FIGS. 6A and 6B. It includes of the same configuration in these two figures, FIG. 6B showing the driven toothed wheel 35 in transparency to highlight the drive studs 351 and 352.

Referring to FIG. 6B, when the motor 31 rotates by the effect of a remote control, it drives in rotation the worm screw 32 which, in turn, drives in rotation a driving toothed wheel 33. The driving toothed wheel 33 drives in rotation the driven toothed wheel 35 through a pinion 34.

Finally, the driven toothed wheel 35 has two studs 351 and 352 diametrically opposite to one another, radially eccentric and projecting axially with respect to its axis of rotation A4. During the rotation of the wheel 35, these studs are brought to drive successively, as shown in FIG. 6B, the third arm 13 by abutment at each half-turn, that is 180°.

When one of the studs (351,353) drives the transmission lever 1, the second stud, at the end of the displacement necessary to release the bolt 4 via the pawl 2, is brought to bear on the planar end 132 of the third arm 13 of FIG. 7, which stops the rotation of the toothed wheel 35. This end 132 is opposite the one on which the first stud bears to drive the third arm 136. This stud (351, 352) is now in position to carry out driving of the transmission lever 1 for a new unlocking cycle after the backrest is locked again on its striker G.

Thus, the latch S according to the teachings of the present disclosure can be completely autonomous such that it is not necessary to reset the actuator 3 by a reverse actuation of the motor 31 or any other system for repositioning the elements. Also, since the studs are located at 180° from each other, the first one can drive the transmission lever and the second one can serve as an end-of-travel stop.

Thus, the third arm 13 is displaced, the latter belonging to the transmission lever 1, drives the displacement thereof and allows displacing in turn the pawl 2 so as to bring it towards its position for clearing the way with respect to the movement of the bolt 4. Thus, the seat may be freed so as to be able to fold it down electrically without the need to use the handle 110.

The latch S according to the teachings of the present disclosure has components that may be produced and assembled so that the assembly may be fastened to the frame of a folding seat of a motor vehicle.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electric latch for a folding seat of a motor vehicle, located inside a case, the latch comprising:
   a locking means adapted to be displaced between a position in which a striker is retained and a position in which the striker is released;
   a blocking element adapted to be displaced between a position for blocking the locking means in the striker retention position and a position for clearing the way with respect to the displacement of the locking means;
   a transmission lever secured to the blocking element so as to displace the blocking element between the position for blocking the locking means in the striker retention position and the position for clearing the way with respect to the displacement of the locking means; and
   an actuator including an electric motor, the actuator being adapted to displace the transmission lever,
   wherein the transmission lever moves about an axis of rotation (A1) and has a first arm and a second arm that extend radially from the axis (A1), an end of the first arm having a handle configured to manually displace the transmission lever and an end of the second arm having a means for securing with the blocking element.

2. The electric latch according to claim 1, wherein the locking means is a bolt rotatable about an axis (A2), the bolt including a depression adapted to receive the striker and wherein the blocking element is a pawl rotatable about an axis (A3), the pawl including a first radial excrescence and a second radial excrescence, the first excrescence is adapted to abut against the bolt to hold the bolt in the striker retention position and the second excrescence is a ball joint adapted to be displaced by the transmission lever.

3. The electric latch according claim 1, wherein the securing means is fork shaped with two teeth, where a space between the two teeth is adapted to grasp the blocking element so as to be able to displace the blocking element between the blocking position and the clearing position.

4. The electric latch according to claim 1, wherein the securing means includes a third arm extending transversely and including a recess adapted to receive a drive element of the actuator.

5. The electric latch according to claim 4, wherein the drive element is a stud having a water drop shape projecting axially from the driven toothed wheel so as to displace the transmission lever by abutment on contact surfaces of the recess.

6. The electric latch according to claim 1, wherein the actuator includes a worm screw driven in rotation by the motor, the screw driving in rotation a driving toothed wheel in turn adapted to drive in rotation a driven toothed wheel, the driven toothed wheel having at least one drive element radially eccentric and projecting axially with respect to an axis of rotation (A4) of the driven toothed wheel.

7. The electric latch according to claim 6, wherein the driven toothed wheel has two drive elements diametrically opposite to one another and disposed on the same face of the driven toothed wheel.

8. The electric latch according to claim 6, wherein the driving toothed wheel drives in rotation the driven toothed wheel through a pinion.

9. The electric latch according to claim 6, wherein the drive element is a stud having a water drop shape projecting axially from the driven toothed wheel so as to displace the transmission lever by abutment on contact surfaces of the recess.

10. The electric latch according to claim 6, wherein the axes (A1) and (A4) are parallel, the axes (A2) and (A3) are parallel, the axes (A2) and (A3) being perpendicular to the axes (A1) and (A4).

11. The electric latch according to claim 1, wherein the blocking element is connected to an elastic means adapted to bias the blocking element towards the position for blocking the locking means in the striker retention position and in that the locking means is connected to an elastic means adapted to bias it towards the striker release position.

12. The electric latch according to claim 1, wherein the latch is secured to a support adapted to be secured to a seat frame.

13. The electric latch according to claim 1, wherein the latch does not comprise any cable or rod configured to displace the locking means into a position in which the striker is released.

14. The electric lock according claim 1, wherein the latch does not comprise any switch configured to output a stop instruction to the motor.

* * * * *